May 28, 1957 G. E. KAUFMAN 2,793,839
FOOD MIXERS
Filed March 11, 1954 4 Sheets-Sheet 1

May 28, 1957     G. E. KAUFMAN     2,793,839
FOOD MIXERS
Filed March 11, 1954     4 Sheets-Sheet 2
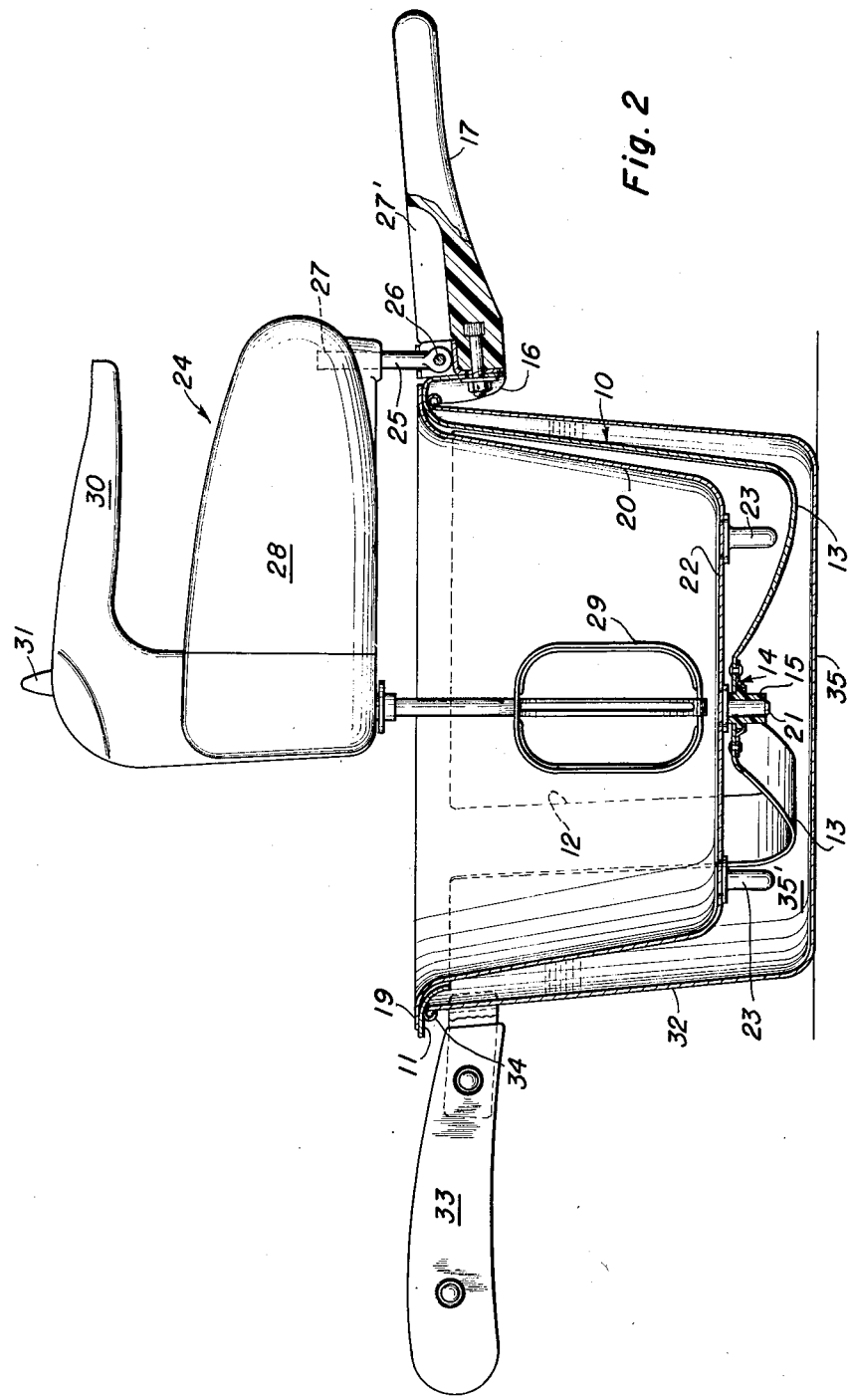

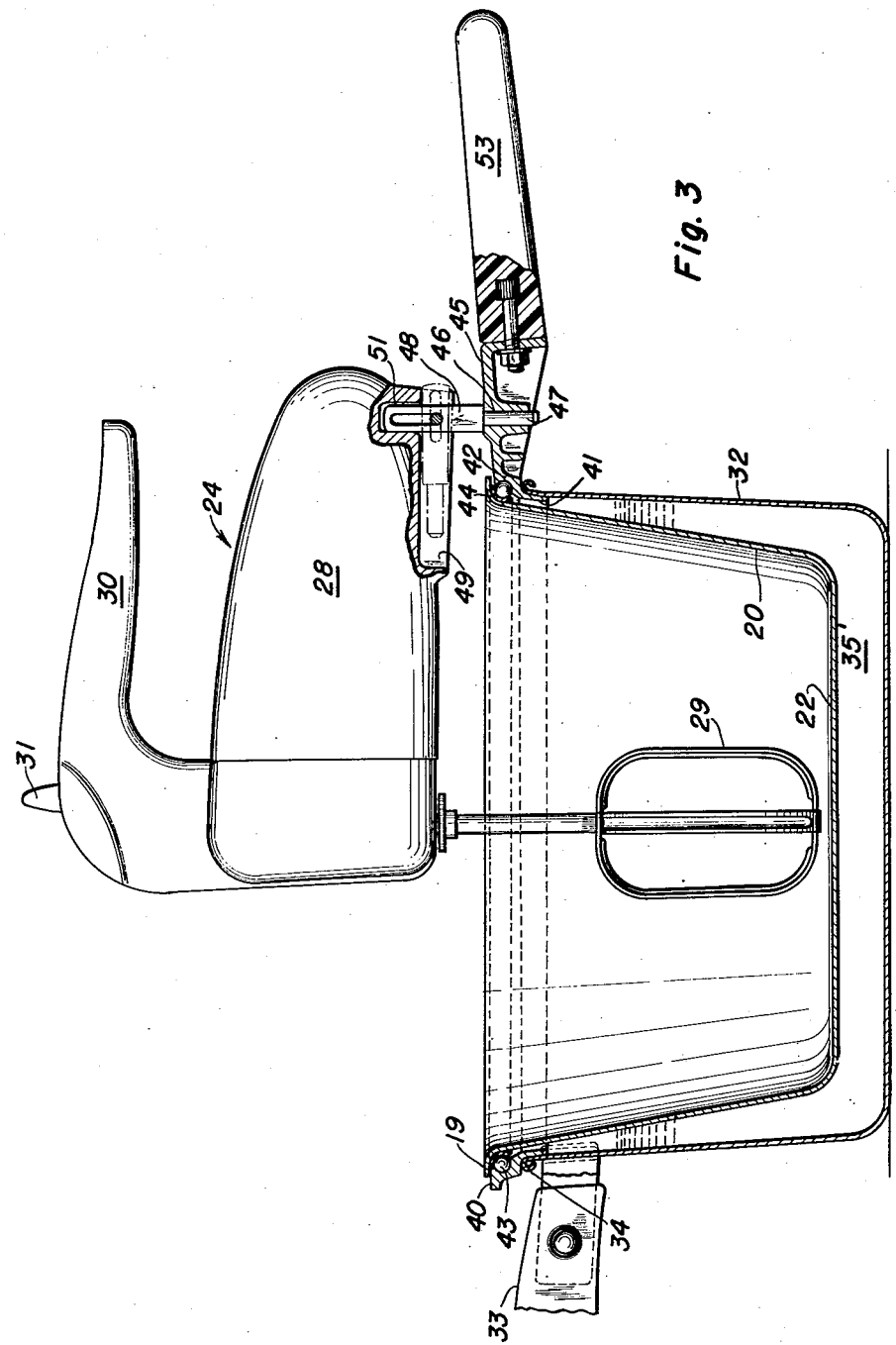

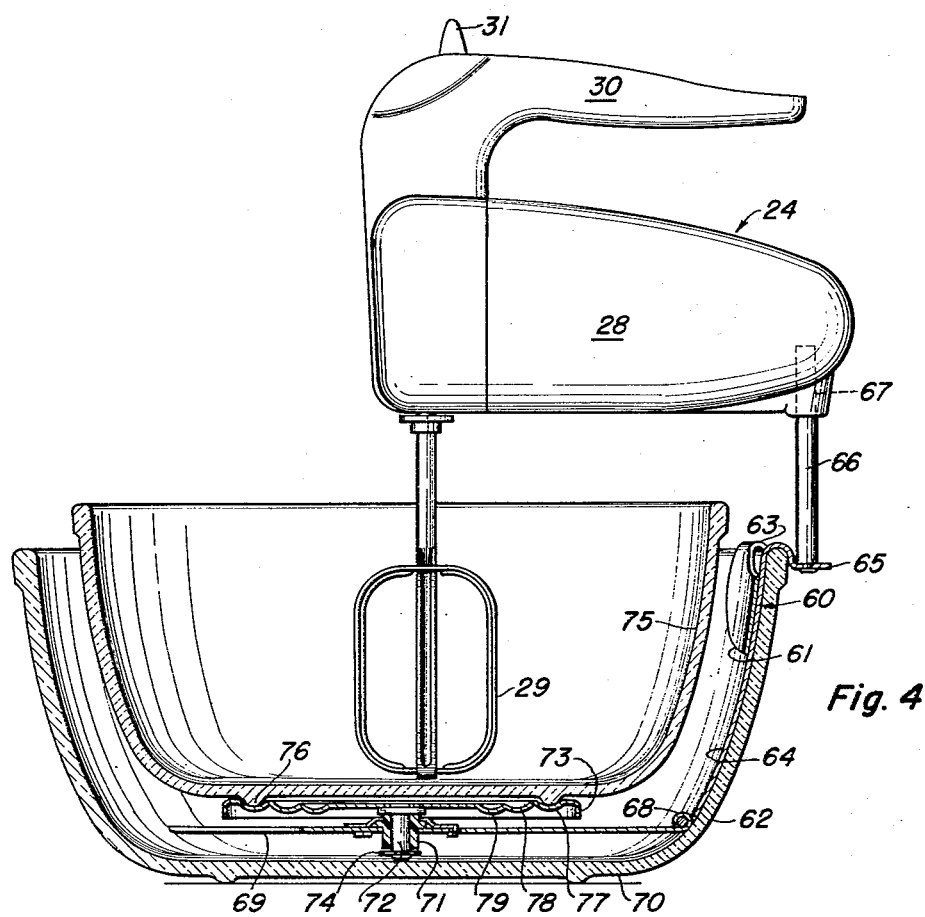
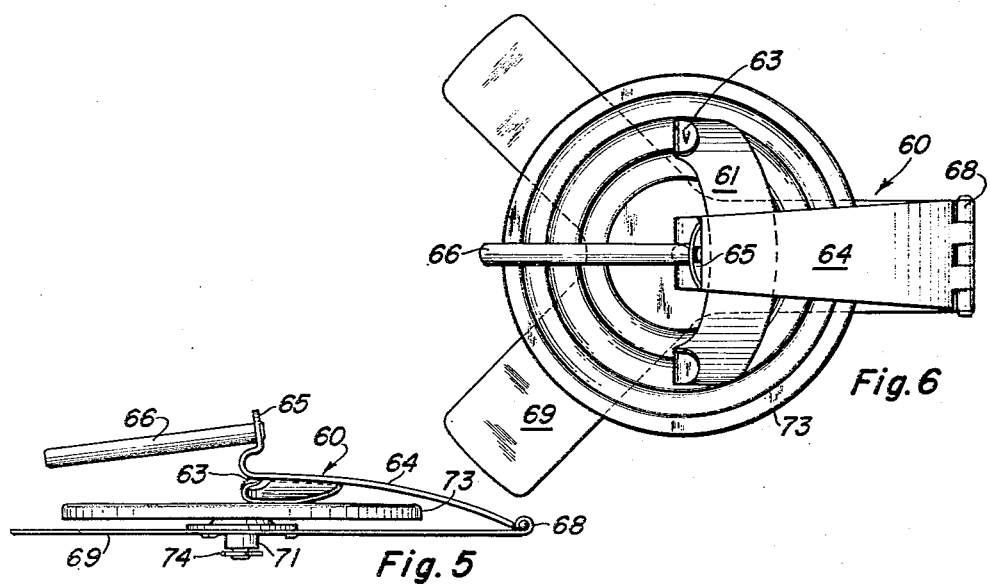

United States Patent Office 2,793,839
Patented May 28, 1957

2,793,839
FOOD MIXERS

George E. Kaufman, Canton, Ohio, assignor to The Hoover Company, North Canton, Ohio, a corporation of Ohio Application March 11, 1954, Serial No. 415,647

13 Claims. (Cl. 259—51)

The present invention relates to food mixers and more particularly to a supporting assembly for double bowl or receptacle mixers in which an inner bowl or receptacle is rotatably supported within an outer bowl or receptacle and a portable mixer unit is supported by the supporting assembly.

More particularly, the present invention relates to an independent support for the inner bowl or receptacle whereby it may be removed from the outer bowl or receptacle and be used independently thereof.

According to one aspect of the present invention, the independent support for supporting the inner bowl may be removed from the outer bowl and used to rotatably support the inner bowl of the mixer unit as an independent mixer unit.

According to one modification of the present invention, the inner bowl or receptacle is provided with feet whereby it may be supported independently of the supporting assembly.

According to a second modification of the invention, unmodified standard bowls or receptacles may be used, the support of the present invention being adapted to support a number of smaller bowls in the larger bowl.

According to the present invention, the independent support is adapted to fit into the larger of a set of mixing bowls or receptacles and to rotatably support any one of the smaller bowls of the set.

According to the present invention, the support for the inner bowl or receptacle is a separate unit independent of either of the bowls or receptacles and may be sold as a separate item for use with standard bowls or receptacles.

According to one modification of the present invention, the independent support for the inner bowl or receptacle and the portable mixer unit is foldable into a compact package for convenient storage purposes.

Other objects and advantages of the present invention will become apparent when taken in connection with the accompanying drawings in which:

Figure 2 is a side view partly in section showing the modification of Figure 1 mounted within a standard pan or receptacle;

Figure 3 is a side view of a second modification of the invention partly in section showing the invention as it may be applied to standard cooking vessels;

Figure 4 is a side view of a third embodiment of the invention partly in section showing how the invention may be applied to standard mixing bowls;

Figure 5 shows the supporting assembly of the modification of Figure 4 in folded position; and Figure 6 is a plan view of the folded supporting assembly of Figure 5.

Figure 1:
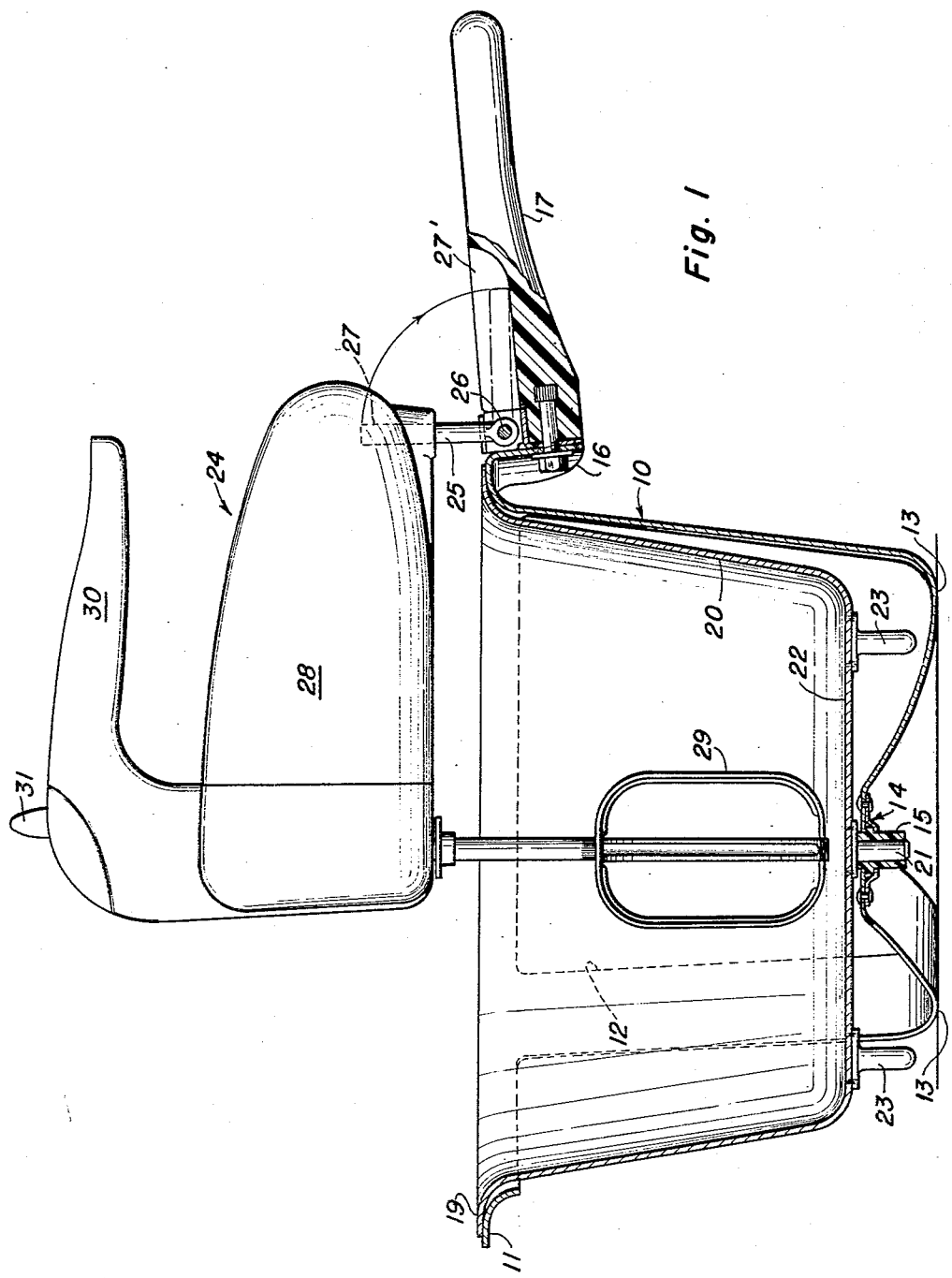
Figure 1 is a side view of one modification of the invention partly in section showing the inner pan or receptacle supported independently of the outer pan or receptacle.

Referring to Figures 1 and 2 of the drawings, the reference numeral 10 generally represents one form of the supporting assembly of the present invention. The supporting assembly 10 includes an annulus 11 and a spider-like frame 12 having three or more legs forming feet 13 whereby the supporting assembly 10 may be independently supported on any flat surface. The feet 13 are extended upwardly and meet at a common center 14 to support a bearing 15 which may be made of any suitable material, such as a plastic, which is inert to and will not odorize any materials which are to be mixed. The bearing material 15 should also be heat resistant for any temperatures to which the material being mixed may be heated.

The annulus 11 also includes a bracket 16 upon which an insulating handle 17 is mounted by which the support 10 and its accessories may be conveniently carried about.

The supporting assembly 10 is constructed to rotatably support a mixing bowl or receptacle 20 having a male bearing spindle 21 welded centrally to its bottom 22 and rotatable within the female bearing 15 previously described and carried by the legs 13 of the support 10, there being sufficient clearance between the flange 19 and the annulus 11 to provide for the free rotation of the receptacle or pan 20. The receptacle 20 may also be provided with feet 23 whereby it may be supported independently of the supporting assembly 10.

The handle 17 is also constructed to support a portable mixer unit generally indicated by reference numeral 24 by means of a support 25 pivoted to the handle 17 at 26 and foldable downwardly into a recess 27' of the handle 17 when not in use. The support 25 is movable to a vertical position as shown in Figure 1 to engage in a socket 27 in the rear end of the casing 28 of the mixer unit 24.

The casing 28 of the mixer unit 24 houses a motor and gearing for driving the mixers 29 in a manner well known in the art. The portable mixer unit 24 is provided with a carrying handle 30 having a control switch 31 for supplying electric current to the motor of the mixer unit 24, the electric current being supplied by an electric conductor connected to a suitable electric outlet as is well known in the art.

The unit just described is adapted to be used as a mixer independently of any added apparatus, the unit being supported by the feet 13 on any suitable supporting surface with the mixer unit 24 supported on the handle 17 by means of the support 25 as shown in Figure 1. When the mixer unit is energized by means of the switch 31, the mixers 29 will be rotated. The reaction between the mixers 29, the material being mixed and the walls of the mixers 20 will cause the latter to be rotated on the bearing 15—21 whereby all of the contents of the receptacle 20 will be throughly mixed.

The support 10 and receptacle 20 of Figure 1 is also adapted to be mounted within an outer receptacle 32 which may be a sauce pan of the usual construction having a handle 33 attached thereto and a rolled annular rim 34 upon which the annulus 11 of the support 10 may rest, to hold the support 10 free of the bottom 35 of the pan 32 whereby the receptacle 20 may freely rotate within the outer pan or receptacle 32.

The outer pan or receptacle 32 may be partially filled with the material 35' which may be either water or crushed ice mixed with water. If the material being mixed needs to be heated during the mixing operation, the material 35' may be water and the receptacle 32 may be heated by any type of heater such as a gas or electric heater. If the material being mixed needs to be chilled during the mixing operation, the material 35' may be crushed ice or a mixture thereof in chilled water.

The modification of Figure 3 is similar to that of Figures 1 and 2 and where the parts are the same they have been given the same reference numerals.

In the modification of Figure 3 the sauce pan 32 is the same as in Figures 1 and 2. An annular support 40 having a flange 41 fitting in the upper rim of the pan 32 is formed to rotatably support the inner receptacle 20 and the mixer unit 24 in a manner which will presently appear.

As in the case of the modification of Figures 1 and 2, the outer receptacle 32 may be provided with a heating or chilling liquid 35'.

The annular supporting ring 40 includes a ball race 42 for receiving ball bearings 43 which are held in the race 42 by an annular retaining ring 44 which rotatably supports the flange 19 of the inner receptacle or pan 20.

A bracket 45 extends outwardly from the annular supporting ring 40 and is provided with a socket 46 for receiving the supporting pin 47 of a support 48 which is collapsible into a recess 49 in the casing 28 by a pin and slot connection, as shown, casing 28 being provided with a recess 51 for receiving the upper end of the support 48 when the latter is in supporting position. An insulating handle 53 is attached to bracket 45 whereby the supporting ring may be carried about whether or not the inner receptacle and the mixer unit 24 are supported thereon.

The modification of Figures 4, 5 and 6 is especially adapted for use with a standard set of "Pyrex" or ceramic mixing bowls, two of which are shown in Figure 4.

The portable mixing unit 24 is substantially the same as that in the other modifications and where the parts are the same they have been given the same reference numerals.

The removable supporting assembly of the modification of Figures 4, 5 and 6 is generally indicated by the reference numeral 60 and has an arcuate arc-shaped portion 61 curved to fit the interior of the rim of the larger of a set of mixing bowls designated by the reference character 62. The support 60 includes hooks 63 for engagement over the rim of bowl 62 and with an elongated downward extension 64, the latter being curved to fit the interior of the bowl 62 and being welded to the member 61. A bracket 65 at the upper end of the support 60 extends over the upper edge or rim of the bowl 62 and forms a support for a post 66 which enters a socket 67 in the rear end of the casing 28 of the portable mixer unit 24 whereby the latter is supported on the edge of the bowl 62 with the mixers 29 extending downwardly into the interior of the inner bowls.

Pivoted at 68 to the lower end of the extension 64 is a three-legged spider 69 of the general shape shown in Figure 6, the pivot 68 being constructed to hold the spider 69 in a horizontal position above the bottom 70 of the bowl 62 as shown in Figure 4. A female bearing 71 similar to the bearing 15 of Figure 1 is supported centrally of the spider 69 and receives a male bearing spindle 72 extending downwardly from a turntable 73, the bearing elements 71 and 72 being held in assembled position by a cotter key or pin 74.

The turntable 73 is formed to rotatably support any one of the three smaller bowls of a set of four mixing bowls, the bowl 62 being the largest of the set. In Figure 4, the second largest bowl of the set is indicated by the reference numeral 75.

Each of the bowls of the set have a downwardly extending annular protuberance, that of the bowl 75 being shown at 76. The turntable 73 is provided with three annular depressions 77, 78 and 79 to receive the annular protuberances on the bottom of the three smaller bowls of the set whereby each may be rotatably mounted within the largest bowl 62 of the set by the support generally indicated by the reference numeral 60.

With the parts in the position shown in Figure 4 and the portable mixer unit 24 energized, the rotation of the mixers 29 will cause a reaction between the material being mixed and the walls of the bowl 75 to cause the latter to be rotated on the turntable 73 within the largest bowl 62. The same would be true with the smaller bowls. The inner bowls may also be rotated by hand if found necessary.

The bowls may be made of a heat resistant glass such as "Pyrex." Thus, if it is necessary to apply heat, bowl 62 may be partially filled with water and heated during the mixing operation. If chilling is required, the bowl may be partially filled with crushed ice or with chilled water. If no heat or chilling is required, the bowl may be left empty.

The support 60 of the modification of Figures 4 to 6, inclusive, may be folded into a compact package for storage, as shown in Figures 5 and 6, and if desirable may be placed in the large bowl 62 for storage.

From the foregoing it can be seen that each modification of the present invention provides a readily removable support by which one receptacle may be removably and rotatably supported in another and in which the support in each modification also includes means for supporting a removable portable mixer unit in such a position that the mixer extends downwardly into the interior of the receptacles.

It is also apparent that according to the first modification, the support may be used independently of the outer receptacle to rotatably support a mixing receptacle as well as to support the portable mixer unit.

It is also apparent that according to one modification of the invention, the combined supporting assembly may be folded into a compact package for storage purposes.

While I have shown and described but three modifications of my invention, it is to be understood that those modifications are to be taken as illustrative only and not in a limiting sense. I do not wish to be limited to the specific structure shown and described but wish to include all equivalent variations thereof except as limited by the scope of the claims.

I claim:

1. In a food mixer having inner and outer mixing receptacles, a support for detachably and rotatably mounting one of said mixing receptacles inside the other including, means detachably engaging the outer receptacle to position the inner receptacle therein, means for detachably and rotatably supporting the inner receptacle on the support, and means for detachably supporting a portable mixer on the support.

2. In a food mixer having inner and outer receptacles, a supporting assembly detachably engageable with the rim of said outer receptacle, means on said support for detachably and rotatably supporting said inner receptacle concentrically within said outer receptacle and for detachably supporting a portable mixing unit having a power unit and downwardly extending mixers, the arrangement being such that when said support, receptacles and mixing unit are in assembled relationship said mixers will extend downwardly into the interior of said inner receptacle.

3. In a food mixer according to claim 2 in which said support assembly comprises an annulus normally engaging the upper rim of said outer receptacle and provided with supporting feet extending downwardly from said annulus and engageable with a supporting surface to rotatably support said inner receptacle and support said portable mixing unit independently of said outer receptacle whereby said inner receptacle, support assembly and portable mixing unit may be used as a mixer independently of said outer receptacle.

4. In a food mixer according to claim 3 including a handle attached to said annulus whereby said supporting assembly, said inner receptacle and said portable mixing unit may be carried about as a unit.

5. In a food mixer according to claim 3 including a bearing positioned centrally of said supporting feet cooperating with a complemental bearing on said inner receptacle for rotatably supporting the latter independently of said outer receptacle.

6. In a food mixer according to claim 2 including a handle for said supporting assembly and means on said handle for supporting said portable mixer unit with the downward extending mixers extending downwardly into said inner receptacle.

7. In a food mixer according to claim 2 in which said support assembly comprises an annulus resting on the rim of said outer receptacle, an annular bearing race formed in said annulus, a second annular bearing race associated with the bearing race of said annulus and coacting therewith to trap an annular ring of ball bearings between them and said inner receptacle having an outwardly extending annular flange engaging said second annular bearing race whereby said inner receptacle is rotatably mounted within said outer receptacle.

8. In a food mixer according to claim 7 including a bracket extending radially from said annulus and means on said bracket for detachably supporting said portable mixing unit with the mixers thereof extending downwardly into said inner receptacle.

9. In a food mixer according to claim 8 including a handle attached to said bracket whereby said supporting assembly, said inner receptacle and said portable mixer unit may be carried about independently of said outer receptacle.

10. In a food mixer according to claim 2 adapted for use with the standard set of four mixing bowls of such size as to be nested one within the other, in which said supporting assembly includes a support shaped to conform to the interior of the larger of said bowls, means for detachably supporting said support on the rim of the larger bowl, and a turntable rotatable on said supporting assembly, said turntable being formed to rotatably support any one of the three smaller bowls of the set.

11. In a food mixer according to claim 10 in which said turntable is rotatably mounted on a table or spider pivoted to the lower end of said supporting assembly on a horizontal axis whereby the supporting assembly and turntable may be folded into a compact package for storage purposes.

12. In a food mixer according to claim 10 in which said supporting assembly is provided with a supporting post adjacent the rim of the larger of said bowls for detachably supporting said portable mixer unit with the mixers thereof extending downwardly into the inner bowl when the parts are in assembled relationship.

13. A food mixer comprising inner and outer receptacles, a supporting assembly, means on said supporting assembly for engaging the rim of said outer receptacle, said supporting assembly including downwardly extending means extending downwardly into said outer receptacle to adjacent the bottom thereof, a vertical axis bearing supported on said downwardly extending means centrally of said outer receptacle, and means associated with said inner receptacle and cooperating with said bearing for rotatably supporting said inner receptacle on a vertical axis centrally of said inner receptacle, said supporting assembly including means for supporting a portable mixer adjacent the edge of said outer receptacle with its mixers extending downwardly into said inner receptacle.

References Cited in the file of this patent

UNITED STATES PATENTS

| | | |
|---|---|---|
| 136,632 | Whipple | Mar. 11, 1873 |
| 1,295,684 | Bouquin | Feb. 25, 1919 |
| 1,385,404 | Skeffington | July 26, 1921 |
| 1,956,621 | Parker | May 1, 1934 |
| 2,237,859 | Bille | Apr. 8, 1941 |
| 2,648,514 | Rosier et al. | Aug. 11, 1953 |

FOREIGN PATENTS

| | | |
|---|---|---|
| 431,244 | Italy | Feb. 25, 1898 |